(12) United States Patent
Maeshiro et al.

(10) Patent No.: US 11,474,261 B2
(45) Date of Patent: Oct. 18, 2022

(54) INFORMATION PROCESSING METHOD, PROGRAM, AND INFORMATION PROCESSING SYSTEM

(71) Applicants: AEROSENSE INC., Tokyo (JP); KAITEKI-KUKAN FC Co., Ltd., Fukuoka (JP)

(72) Inventors: Tomohiro Maeshiro, Kanagawa (JP); Tomohiko Hishinuma, Kanagawa (JP); Kohtaro Sabe, Tokyo (JP); Naohiro Ukai, Fukuoka (JP)

(73) Assignees: AEROSENSE INC., Tokyo (JP); KAITEKI-KUKAN FC CO., LTD., Fukuoka (JP)

( * ) Notice: Subject to any disclaimer, the term of this patent is extended or adjusted under 35 U.S.C. 154(b) by 527 days.

(21) Appl. No.: 16/512,411

(22) Filed: Jul. 16, 2019

(65) Prior Publication Data
US 2020/0025939 A1   Jan. 23, 2020

(30) Foreign Application Priority Data
Jul. 17, 2018   (JP) .............................. JP2018-134580

(51) Int. Cl.
| G01S 19/43 | (2010.01) |
| G01S 19/07 | (2010.01) |
| G01S 19/10 | (2010.01) |
| G06F 17/11 | (2006.01) |
| G06V 20/13 | (2022.01) |

(52) U.S. Cl.
CPC .............. *G01S 19/43* (2013.01); *G01S 19/07* (2013.01); *G01S 19/10* (2013.01); *G06F 17/11* (2013.01); *G06V 20/13* (2022.01)

(58) Field of Classification Search
CPC .......... G01S 19/43; G01S 19/07; G01S 19/10; G06F 17/11; G06K 9/0063
USPC .................. 342/352, 357.26, 357.44, 357.47
See application file for complete search history.

(56) References Cited

U.S. PATENT DOCUMENTS

| 5,528,518 | A  | * | 6/1996  | Bradshaw | ............ | G09B 29/106 |
| | | | | | | 702/158 |
| 8,872,700 | B2 | * | 10/2014 | Ashjaee | .................. | G01S 19/40 |
| | | | | | | 342/357.26 |
| 9,720,093 | B2 | * | 8/2017  | Ashjaee | ................... | G01C 7/02 |
| 10,222,210 | B2 | * | 3/2019  | Maehara | ............... | G01B 11/002 |
| 10,337,863 | B2 | * | 7/2019  | Kumagai | .................. | G06T 7/70 |

(Continued)

FOREIGN PATENT DOCUMENTS

| JP | 2001-337155 A | 12/2001 |
| JP | 2006-329644 A | 12/2006 |

(Continued)

*Primary Examiner* — Chuong P Nguyen
(74) *Attorney, Agent, or Firm* — Xsensus LLP

(57) ABSTRACT

Provided is an information processing method including: acquiring position information associated with installation points of a plurality of observation apparatuses based on signals received from a GNSS satellite by the plurality of observation apparatuses that has executed simultaneous observation, and position information associated with known control points; and generating, by a processor, a check network based on a first automatic generation algorithm by using the position information associated with the installation points of the plurality of observation apparatuses acquired and the position information associated with the known control points.

13 Claims, 13 Drawing Sheets

(56) References Cited

U.S. PATENT DOCUMENTS

| | | | |
|---|---|---|---|
| 10,642,284 B1* | 5/2020 | Barazovsky | G01C 21/005 |
| 10,761,217 B2* | 9/2020 | Shimizu | G01S 7/4972 |
| 2020/0379126 A1* | 12/2020 | Shimizu | G01S 19/45 |
| 2021/0318446 A1* | 10/2021 | Kishimoto | G01S 19/235 |
| 2021/0349220 A1* | 11/2021 | Miyamoto | G01S 19/37 |

FOREIGN PATENT DOCUMENTS

| | | |
|---|---|---|
| JP | 2016-138826 A | 8/2016 |
| JP | 2017-179978 A | 10/2017 |
| JP | 2017-179979 A | 10/2017 |
| KR | 10-2017-0090828 A | 8/2017 |

* cited by examiner

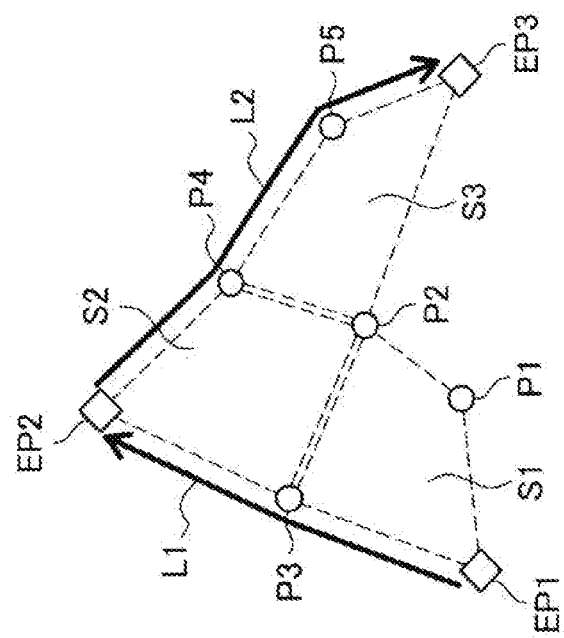
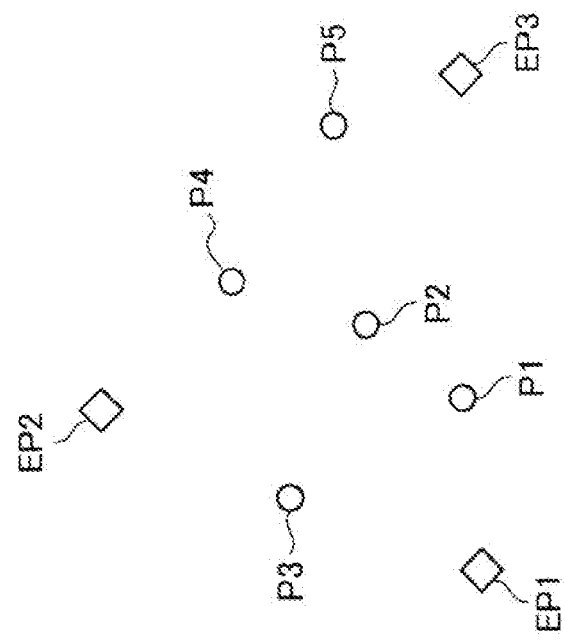
FIG. 5

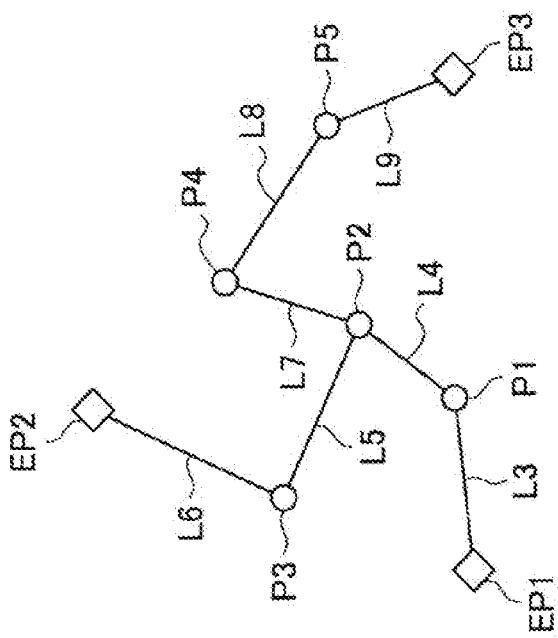
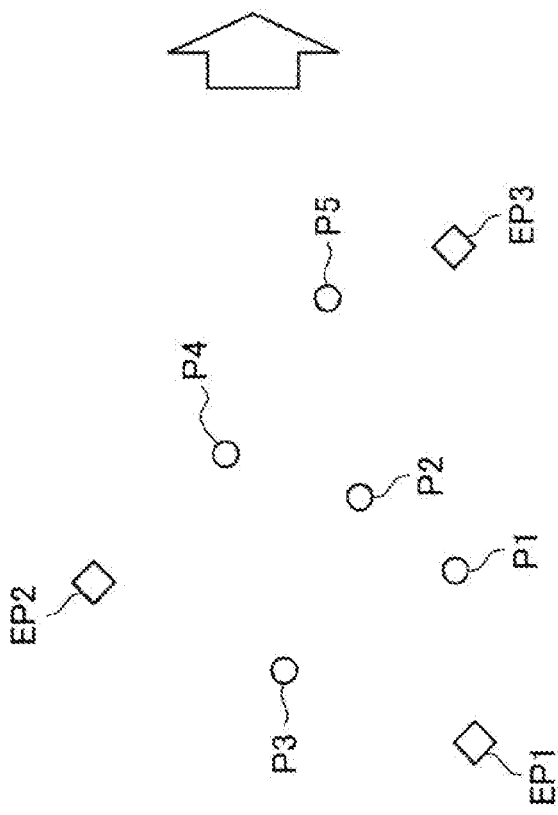
FIG. 7

INFORMATION PROCESSING METHOD, PROGRAM, AND INFORMATION PROCESSING SYSTEM

CROSS-REFERENCE TO RELATED APPLICATION

The present disclosure contains subject matter related to that disclosed in Japanese Priority Patent Application JP 2018-134580 filed in the Japan Patent Office on Jul. 17, 2018, the entire content of which is hereby incorporated by reference.

BACKGROUND

The present disclosure relates to an information processing method, a program, and an information processing system.

In recent years, a technology for performing control surveys by utilizing radio signals transmitted from global navigation satellite system (GNSS) satellites has been widespread.

For example, Japanese Patent Laid-open No. 2017-179978 discloses a technology for enabling after-the-fact check of errors calculated in control surveys. Further, Japanese Patent Laid-open No. 2017-179979 discloses a technology for facilitating management of information associated with results of control surveys.

SUMMARY

In the related art, however, various maps that are used in control surveys are manually created, for example, and such work takes a lot of effort.

The present disclosure has been made in view of the above, and it is desirable to provide an information processing method, a program, and an information processing system that can increase the efficiency of map creation in control surveys.

According to an embodiment of the present disclosure, there is provided an information processing method, including: acquiring position information associated with installation points of a plurality of observation apparatuses based on signals received from a GNSS satellite by the plurality of observation apparatuses that has executed simultaneous observation, and position information associated with known control points; and generating, by a processor, a check network based on a first automatic generation algorithm by using the position information associated with the installation points of the plurality of observation apparatuses acquired and the position information associated with the known control points.

Further, according to an embodiment of the present disclosure, there is provided a program for causing a computer to function as an information processing apparatus including: an information acquisition unit configured to acquire position information associated with installation points of a plurality of observation apparatuses based on signals received from a GNSS satellite by the plurality of observation apparatuses that has executed simultaneous observation, and position information associated with a known control point; and an automatic generation unit configured to generate a check network based on an automatic generation algorithm by using the position information associated with the installation points of the plurality of observation apparatuses acquired and the position information associated with the known control point.

Further, according to an embodiment of the present disclosure, there is provided an information processing system including: a plurality of observation apparatuses configured to execute simultaneous observation based on signals received from a GNSS satellite; an information acquisition unit configured to acquire position information associated with installation points of the observation apparatuses based on the signals received by the observation apparatuses, and position information associated with a known control point; and an automatic generation unit configured to generate, by a processor, a check network based on a first automatic generation algorithm by using the position information associated with the installation points of the observation apparatuses acquired and the position information associated with the known control point.

As described above, according to an embodiment of the present disclosure, the efficiency of map creation in control surveys can be increased.

Note that, the above-mentioned effect is not necessarily limited, and any of effects described herein or other effects that may be grasped from the present specification may be provided in addition to the above-mentioned effect or instead of the above-mentioned effect.

BRIEF DESCRIPTION OF THE DRAWINGS

FIG. 5 is a diagram illustrating an example of operation for generating a check network and a check route on the basis of automatic generation algorithms;

FIG. 7 is a diagram illustrating an example of operation for generating an adjustment calculation network on the basis of an automatic generation algorithm;

DETAILED DESCRIPTION OF THE PREFERRED EMBODIMENTS

Figure 1:
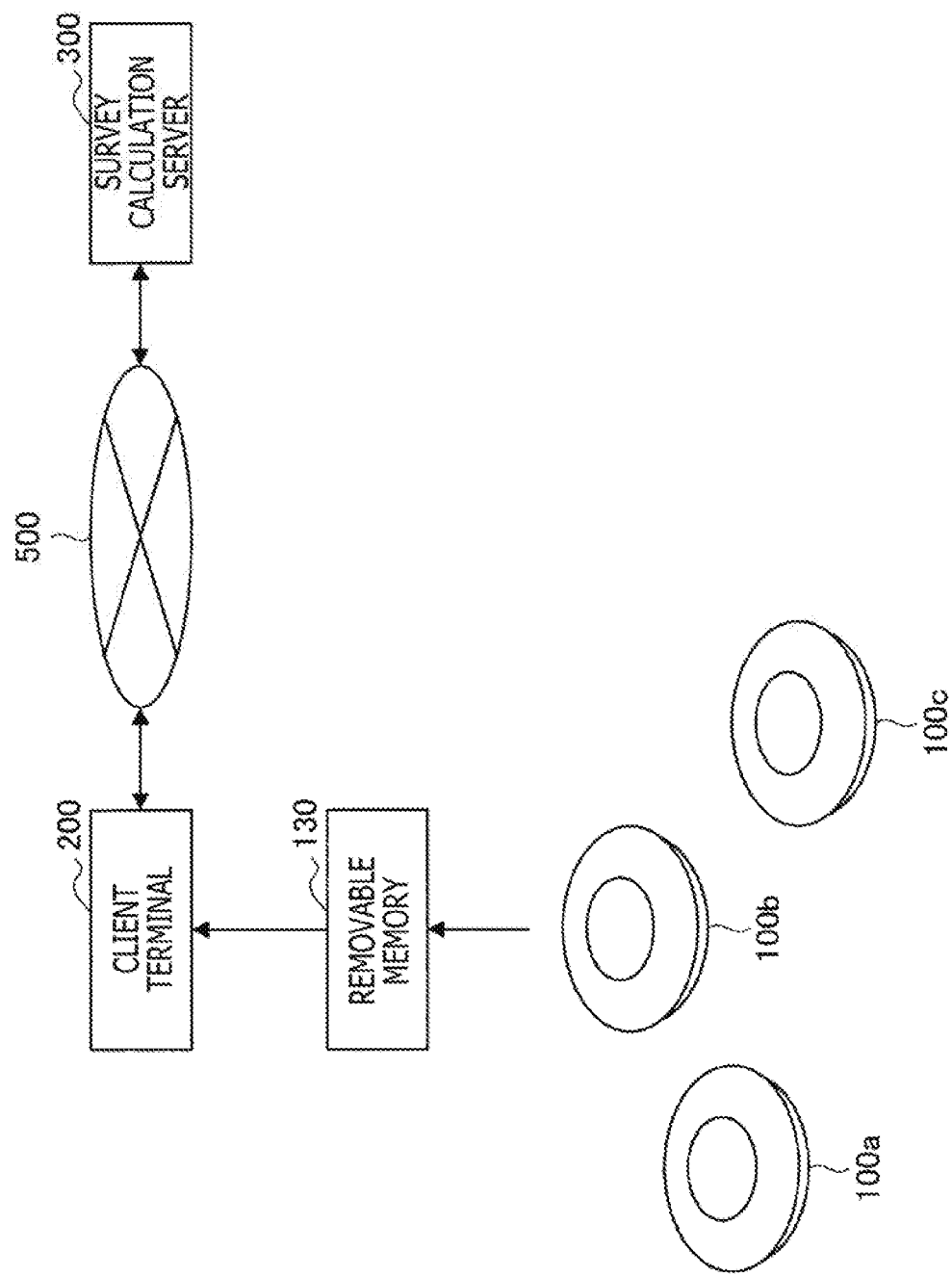
FIG. 1 is a diagram illustrating a configuration example of an information processing system according to a first embodiment.

Preferred embodiments of the present disclosure are described in detail below with reference to the attached drawings. Note that, in the present specification and the drawings, components having substantially the same functional configuration are denoted by the same reference numerals and redundant description is omitted. Further, in order to distinguish a plurality of components having substantially the same functional configuration from each other, the same reference numerals are suffixed with different letters in some cases.

Note that, the following items are described in order.
1. First Embodiment
  1-1. Outline and Configuration Example of Information Processing System
  1-2. Functional Configuration Example of GNSS Reception Apparatus 100
  1-3. Functional Configuration Example of Survey Calculation Server 300
2. Examples of Observation and Survey Calculation Operations
  2-1. Example of Observation-Related Operation
  2-2. Example of Survey Calculation-Related Operation
3. Flow of Operation
  3-1. Flow of Observation-Related Work
  3-2. Flow of Survey Calculation-Related Operation
4. Second Embodiment
5. Third Embodiment
6. Fourth Embodiment
7. Hardware Configuration Example
8. Conclusion

1. First Embodiment (1-1. Outline and Configuration Example of Information Processing System)

The outline and configuration example of an information processing system according to the present disclosure is now described. FIG. 1 is a diagram illustrating a configuration example of an information processing system according to a first embodiment.

First, the outline of a control survey that uses radio signals transmitted from GNSS satellites is described. The information processing system according to the present embodiment can perform a control survey that uses radio signals from a plurality of GNSS satellites. Here, the control survey is work for determining the plane position and elevation of a new control point on the basis of known control points that are points having determined plane positions and elevations. The work processes of a control survey are as follows. First, at a work site to be surveyed, a GNSS reception apparatus receives radio signals from GNSS satellites to perform observation. Next, the GNSS reception apparatus extract data necessary for a control survey (hereinafter referred to as "observed data") from the radio signals that the GNSS reception apparatus have received by observation. Next, a survey calculation server executes various survey-related calculations (hereinafter referred to as "survey calculation") on the basis of the extracted observed data, to thereby determine the plane position and elevation of a new control point. Then, the survey calculation server generates various deliverables on the basis of the result of survey calculation, and the control survey-related work is completed.

Here, the observation is work that includes installing a plurality of GNSS reception apparatuses at a plurality of new control points planned in advance (hereinafter referred to as "installation points"), and controlling the plurality of GNSS reception apparatuses to receive radio signals from GNSS satellites. Further, the survey calculation includes baseline analysis, check calculation, and adjustment calculation. Here, baseline analysis is calculation for determining a baseline that is a distance between installation points and a direction of the baseline on the basis of observed data. Further, the check calculation is calculation that is executed to check the result of baseline analysis after observation work is ended. Further, the adjustment calculation is calculation for obtaining a final survey result. Note that, a survey method that executes observation with the use of radio signals that are transmitted from GNSS satellites is called GNSS surveying. In the case of GNSS surveying, three-dimensional traverse calculation is required to be executed as adjustment calculation. Here, the GNSS is a satellite positioning system such as a global positioning system (GPS), a global navigation satellite system (GLONASS), a Galileo, or a quasi-zenith satellite. In GNSS surveying, a plurality of satellite positioning systems is used in baseline analysis.

Note that, in GNSS surveying, as survey calculation, first, first baseline analysis is executed, and check calculation with respect to the result of this baseline analysis is then executed. After this check calculation is executed, second baseline analysis is executed, and three-dimensional traverse calculation is executed with the use of the result of this baseline analysis.

Note that, in order to execute the above-mentioned various calculations necessary for GNSS surveying, acquisition of position information regarding installation points and position information regarding known control points and generation of network maps are necessary. The network map is a map that corresponds to each calculation that is executed in survey calculation and represents a relationship between an installation point and a known control point.

The outline of control survey using radio signals that are transmitted from the GNSS satellites is described above. Next, a system configuration example according to the present embodiment is described. As illustrated in FIG. 1, the information processing system according to the present embodiment includes a GNSS reception apparatus 100, a removable memory 130, a client terminal 200, a survey calculation server 300, and a network 500.

The GNSS reception apparatus 100 according to the present embodiment is an observation apparatus capable of receiving radio signals from a plurality of GNSS satellites. Note that, in the present embodiment, the plurality of GNSS reception apparatuses 100 executes simultaneous observation. Here, the simultaneous observation means that the plurality of GNSS reception apparatuses 100 receives radio signals from the GNSS satellites at the same time. Further, the GNSS reception apparatus 100 has a function of storing observed data extracted from radio signals in the removable memory 130 inserted into this GNSS reception apparatus 100. The removable memory 130 is described later.

Note that, the GNSS reception apparatus 100 may include GNSS reception apparatuses 100a to 100c that have a configuration in which a plurality of circles is concentrically arranged as illustrated in FIG. 1, for example. Further, the GNSS reception apparatus 100 may have a feature that hues corresponding to the colors of circles adjacent each other are different from each other by a predetermined threshold or more or that one of the hues is black.

The removable memory 130 according to the present embodiment is a storage medium configured to store various pieces of information. Specifically, the removable memory 130 is inserted into the GNSS reception apparatus 100 to store observed data extracted from radio signals. Further, the removable memory 130 is inserted into the client terminal 200 to provide observed data to the client terminal 200.

The client terminal 200 according to the present embodiment is an information processing apparatus configured to receive observed data from the GNSS reception apparatus 100, and transmit this observed data to the survey calculation server 300. Further, the client terminal 200 has a function of displaying, to a user, information associated with survey calculation on the basis of a notification transmitted from the survey calculation server 300. Further, the client terminal 200 may include a display configured to display the information associated with survey calculation to the user.

Here, the information associated with survey calculation is information associated with whether survey calculation has succeeded or not, such as information indicating that a check network has not been generated normally, information indicating that it is determined that there is no fix solution for a part or all of baselines, or information associated with an adjustment calculation network. The details of the above-mentioned matters are described later.

The survey calculation server 300 according to the present embodiment is an information processing apparatus configured to execute survey calculation related to simultaneous observation that the plurality of GNSS reception apparatuses 100 has executed. Further, the survey calculation server 300 is an information processing apparatus configured to acquire position information associated with the installation points of the GNSS reception apparatuses 100 calculated by the plurality of the GNSS reception apparatuses 100 that has executed simultaneous observation on the basis of radio signals received from the GNSS satellites, and position information associated with known control points.

The network 500 according to the present embodiment has a function of connecting the client terminal 200 and the survey calculation server 300 to each other. Further, the network 500 is used when the survey calculation server 300 acquires information associated with electronic control points. The network 500 may include a public network such as the Internet, a telephone network, or a satellite communication network, various local area networks (LAN) including Ethernet (registered trademark), or a wide area network (WAN). Further, the network 500 may include a private network such as an internet protocol-virtual private network (IP-VPN). Further, the network 500 may include a wireless communication network such as Wi-Fi (registered trademark) or Bluetooth (registered trademark).

(1-2. Functional Configuration Example of GNSS Reception Apparatus 100)

Figure 2:
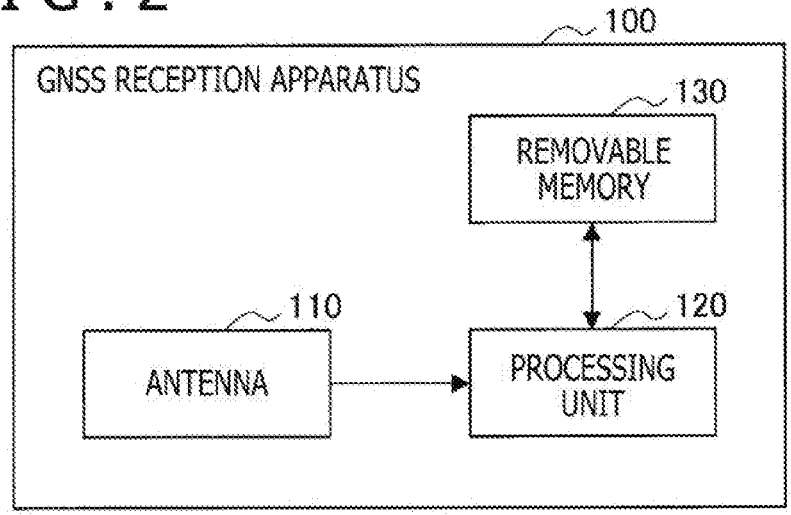
FIG. 2 is a block diagram illustrating a functional configuration example of a GNSS reception apparatus 100 according to the first embodiment.

Next, a functional configuration example of the GNSS reception apparatus 100 according to the present embodiment is described. FIG. 2 is a block diagram illustrating the functional configuration example of the GNSS reception apparatus 100 according to the present embodiment. With reference to FIG. 2, the GNSS reception apparatus 100 according to the present embodiment includes an antenna 110, a processing unit 120, and a removable memory 130.

The antenna 110 functions as a GNSS reception unit configured to receive radio signals from the GNSS satellites, and has a function of providing the radio signals to the processing unit 120 described below.

The processing unit 120 has a function of extracting data from the signals that the antenna 110 has received from the GNSS satellites. Further, the processing unit 120 has a function of providing and storing the extracted observed data to and in the removable memory 130 described below.

The removable memory 130 has a function of storing the observed data that the processing unit 120 has extracted. Note that, this removable memory 130 is identical to the removable memory 130 described in the description of the configuration example of the information processing system. The removable memory 130 is the storage medium capable of being inserted into the GNSS reception apparatus 100 as described above. The removable memory 130 is removed from the GNSS reception apparatus 100 to be inserted into the client terminal 200. This means that observed data of the GNSS reception apparatus 100 can be provided to the client terminal 200 with the use of the removable memory 130.

(1-3. Functional Configuration Example of Survey Calculation Server 300)

Figure 3:
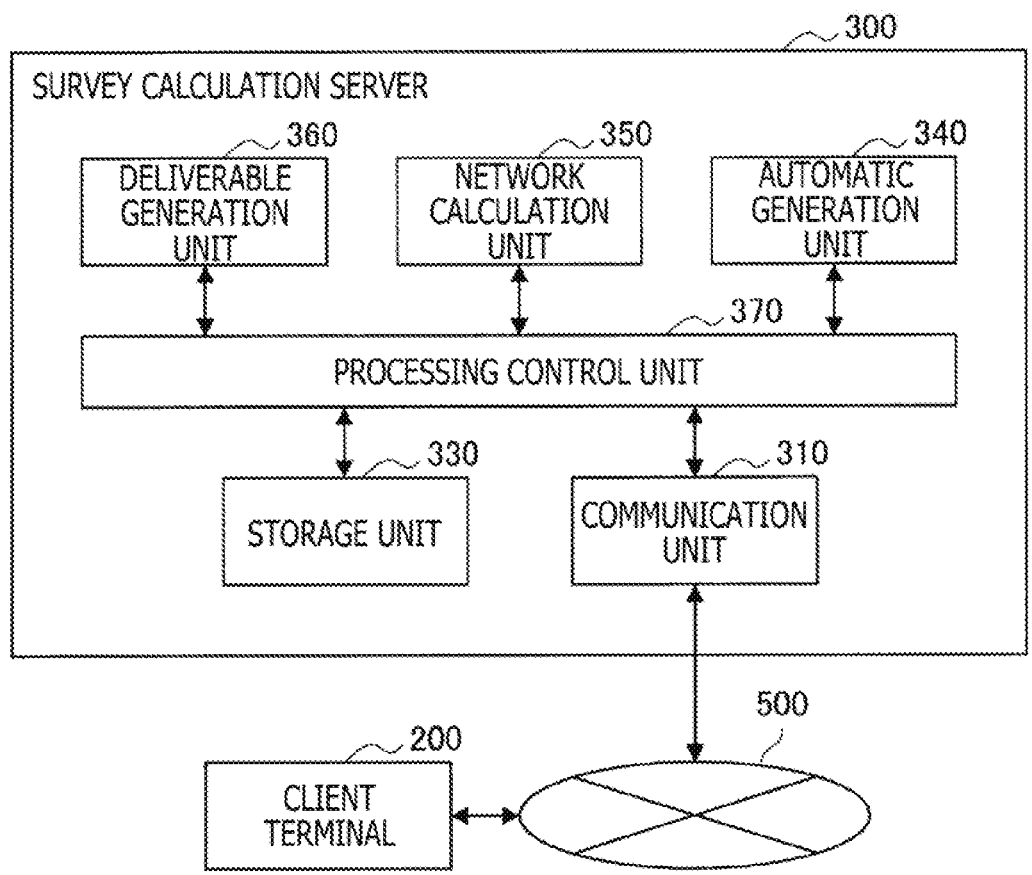
FIG. 3 is a block diagram illustrating a functional configuration example of a survey calculation server 300 according to the first embodiment.

Next, a functional configuration example of the survey calculation server 300 according to the present embodiment is described. FIG. 3 is a block diagram illustrating the functional configuration example of the survey calculation server 300 according to the present embodiment. With reference to FIG. 3, the survey calculation server 300 according to the present embodiment includes a communication unit 310, a storage unit 330, an automatic generation unit 340, a traverse calculation unit 350, a deliverable generation unit 360, and a processing control unit 370.

The communication unit 310 has a function as an information acquisition unit configured to receive observed data from the client terminal 200. Further, the communication unit 310 has a function of transmitting, when the automatic generation unit 340, the traverse calculation unit 350, or the deliverable generation unit 360 notifies the user of various pieces of information, the various pieces of information to the client terminal 200.

Further, the communication unit 310 has a function of acquiring position information associated with electronic control points with the use of the network 500. The position information associated with electronic control points acquired by the communication unit 310 is used in survey calculation.

The storage unit 330 has a function of storing the observed data that the communication unit 310 has received from the client terminal 200. Further, the storage unit 330 may store a deliverable generated by the automatic generation unit 340, the traverse calculation unit 350, or the deliverable generation unit 360.

The automatic generation unit 340 executes positioning processing by absolute positioning with the use of the observed data provided from the client terminal 200, to thereby acquire position information. Further, the automatic generation unit 340 has a function of executing baseline analysis by the static method using the observed data, to thereby acquire position information associated with installation points at which the GNSS reception apparatus 100 have been installed.

Further, the automatic generation unit 340 has a function of generating a check network that is used in execution of check calculation or a check route that connects electronic control points to each other on the basis of various automatic generation algorithms with the use of the position information regarding the installation points of the GNSS reception apparatuses 100 acquired by absolute positioning and position information regarding known control points acquired by the communication unit 310.

Further, the automatic generation unit 340 has a function of generating an adjustment calculation network on the basis of another automatic generation algorithm with the use of the position information regarding the GNSS reception apparatus 100 and the position information regarding known control points. Here, the adjustment calculation network is a network map that is used in execution of three-dimensional traverse calculation, which is a kind of adjustment calculation.

Further, the automatic generation unit 340 may notify the user of the generated check network, check route, or adjustment calculation network by displaying on the client terminal 200, for example. Further, in a case where generation of the check network or adjustment calculation network has failed, the automatic generation unit 340 may notify the user of this generation failure by displaying on the client terminal 200, for example.

The traverse calculation unit 350 has a function of executing check calculation on the basis of the check network or check route generated by the automatic generation unit 340. Further, the traverse calculation unit 350 has a function of executing three-dimensional traverse calculation on the basis of the adjustment calculation network generated by the automatic generation unit 340. Further, the traverse calculation unit 350 may execute, on the basis of the check network generated by the automatic generation unit 340, baseline analysis between known control points and the GNSS reception apparatus 100 in this check network.

The deliverable generation unit 360 has a function of generating various deliverables on the basis of the result of calculation by the traverse calculation unit 350. Here, the deliverable is an observation note or an observation record, for example. Further, the deliverable generation unit 360 may notify the user of the generated deliverable by displaying on the client terminal 200, for example.

The processing control unit 370 has a function of controlling each configuration of the survey calculation server 300. The processing control unit 370 controls start and stop of each configuration, for example.

2. Examples of Observation and Survey Calculation Operations (2-1. Example of Observation-Related Operation)

In the following, control survey-related operation according to the present embodiment is described. First, observation work at a work site is described. First, the plurality of GNSS reception apparatuses 100 executes simultaneous observation on the basis of the static method, to thereby receives observed data at installation points.

The static method is a method in which a plurality of observation apparatuses receives signals from four or more GNSS satellites for a predetermined period of time (for example, one hour) or more, and the integer bias of each carrier wavelength is determined on the basis of a temporal change in position of the GNSS satellite. Although the static method takes relatively long positioning time with respect to other methods, the static method may be expected to achieve high accuracy with errors on the order of millimeters. Note that, observation, positioning processing, and survey calculation may be performed by the real-time kinematic (RTK) method or the kinematic method. Here, the RTK method is a method in which the integer bias of a carrier wavelength is determined when observation is started, and after that, observed data is exchanged through wireless communication between observation apparatuses, so that positioning processing is performed in real time. Further, the kinematic method is also called RTK-GPS, and is a method in which correction observation information from known control points is transmitted to a mobile station that is an observation apparatus by utilizing a mobile phone or a wireless communication apparatus so that the position of the mobile station is measured in real time. Note that, in the following description of the present specification, description is made on operation for a case where observation, positioning processing, and survey calculation by the static method are performed.

Figure 4:
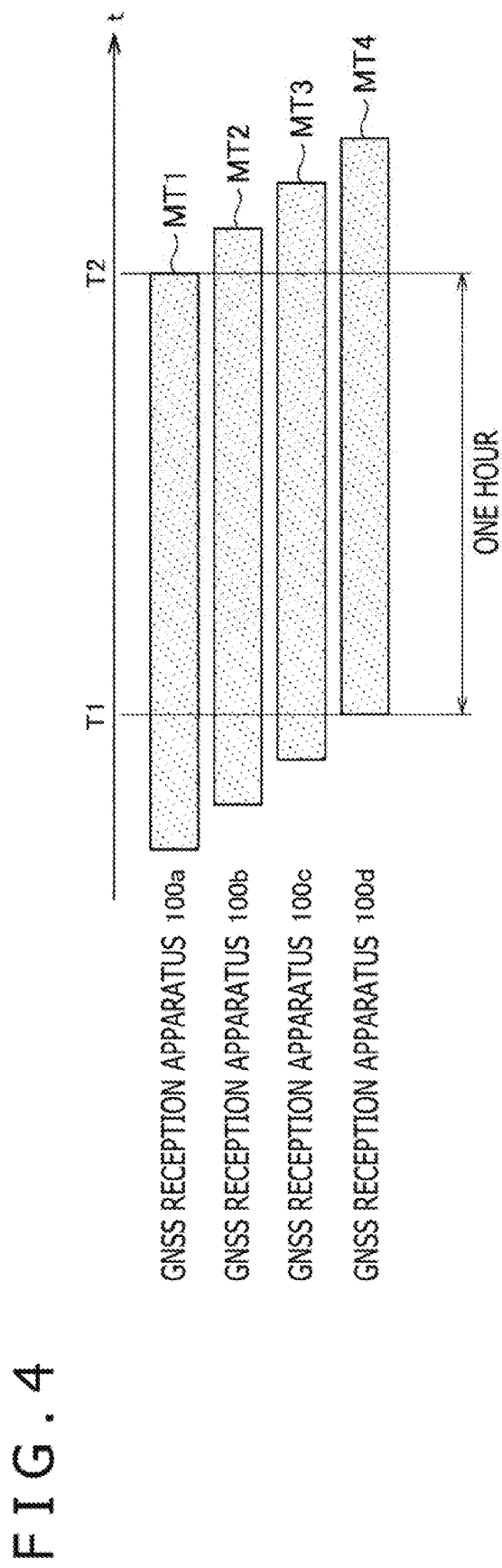
FIG. 4 is a diagram illustrating a simultaneous observation method based on the static method using a plurality of the GNSS reception apparatuses 100.

FIG. 4 is a diagram illustrating a simultaneous observation method based on the static method using the plurality of GNSS reception apparatuses 100. In FIG. 4, observation times MT1 to MT4 corresponding to GNSS reception apparatuses 100*a* to 100*d* are illustrated. Here, it is assumed that the GNSS reception apparatuses 100*a* to 100*d* are each installed at an installation point planned in advance. Further, the observation times MT1 to MT4 represent periods of time during which the respective GNSS reception apparatuses 100*a* to 100*d* receive radio signals from the GNSS satellites.

In the case where the static method is used for observation, in a period of time during which the plurality of GNSS reception apparatuses 100 simultaneously receives radio signals, observed data that is extracted by each of the GNSS reception apparatuses 100*a* to 100*d* is used in survey calculation to be performed later. Specifically, observed data obtained in a period of time from when a state in which the plurality of GNSS reception apparatuses 100*a* to 100*d* is all executing reception of radio signals from the plurality of GNSS satellites is satisfied to when any of the GNSS reception apparatuses 100*a* to 100*d* stops the reception of the radio signals is used in survey calculation to be performed later. In the example of FIG. 4, a period of time that is used for survey calculation is one hour between a start time T1 and an end time T2. The observation times MT1 to MT4 are present in the one hour.

A unit of simultaneous observation that is executed by the plurality of GNSS reception apparatuses 100*a* to 100*d* as described above is called "session." Here, the simultaneous observation is observation in which the plurality of GNSS reception apparatuses 100*a* to 100*d* receives radio signals from the GNSS satellites at the same time. Note that, after the end time T2, the GNSS reception apparatuses 100*a* to 100*d* are collected. In a case where simultaneous observation has been completed for all of the planned sessions, the work at the work site is ended. In a case where simultaneous observation has not been completed for all of the planned sessions, the GNSS reception apparatuses 100*a* to 100*d* are installed at other installation points, and observation like the one above is started.

(2-2. Example of Survey Calculation-Related Operation)

In the above, the observation-related work at the work site is described. As described above, after observation is completed, check calculation is required to be executed to check the quality of the observed data. First, as described above, the removable memory 130 is inserted into the client terminal 200, so that observed data is provided to the client terminal 200. Next, the client terminal 200 transmits this observed data to the survey calculation server 300. The automatic generation unit 340 of the survey calculation server 300 receives the observed data via the communication unit 310. Then, the automatic generation unit 340 generates a check network and a check route.

Here, in order for the survey calculation server 300 to generate the check network and the check route or execute baseline analysis, it is requested that observed data that is raw data is provided to the survey calculation server 300.

Note that, the observed data is also called "RAW data." The RAW data at least includes the phase data of the carrier waves of signals received from the GNSS satellites.

After that, this RAW data is extracted from the GNSS reception apparatus 100 by a predetermined method to be provided to the survey calculation server 300 via the client terminal 200. Then, the survey calculation server 300 performs positioning processing by absolute positioning with the use of this RAW data, thereby being capable of acquiring position information regarding the GNSS reception apparatus 100. Further, the survey calculation server 300 performs survey calculation by the static method with the use of this RAW data, thereby being capable of acquiring more detailed position information regarding the GNSS reception apparatus 100. In this way, the survey calculation server 300 is responsible for the high-load positioning processing, and hence a load on the GNSS reception apparatus 100 can be reduced. In other words, the GNSS reception apparatus 100 may not have high-performance processing functions, which may lead to a reduction in calculation cost.

Now, operation for generating a check network and a check route on the basis of the automatic generation algorithms is descried. FIG. 5 is a diagram illustrating an example of the operation for generating a check network and a check route on the basis of the automatic generation algorithms. On the left side of FIG. 5, installation points P1 to P5 and electronic control point positions EP1 to EP3 are illustrated. Further, on the right side of FIG. 5, sessions S1 to S3 and check routes L1 and L2 are further illustrated. In the following, an example of a case where all of known control points are electronic control points is described.

The automatic generation unit 340 according to the present embodiment executes positioning processing by absolute positioning with the use of observed data provided from the GNSS reception apparatus 100 via the client terminal 200, to thereby acquire position information. Next, the automatic generation unit 340 generates a check network on the basis of a first automatic generation algorithm with the use of the calculated position information and position information associated with known control points. Here, in the case where all of the known control points are electronic control points, the automatic generation unit 340 generates a check route on the basis of a second automatic generation algorithm with the use of the position information and position information associated with the electronic control points.

Specifically, the automatic generation unit 340 generates a check network or a check route from installation points and electronic control point positions by following a check calculation method for control surveys. Further, the electronic control point position is the position of an electronic control point near installation points acquired via the network 500. Note that, the position of an electronic control point near installation points is information that is grasped from position information regarding electronic control points.

As an example of the check route generation method following the check calculation method, there is a method that compares differences of overlapped sides between different sessions. Besides, for the case where electronic control points are used as known control points, there is a method that generates a check route that connects the electronic control points to each other. Note that, a check route is generated such that the number of sides of the check route is minimum.

In the example on the left side of FIG. 5, the electronic control point positions EP1 to EP3 are the positions of three electronic control points near installation points acquired by the communication unit 310, the positions of the electronic control points being determined on the basis of position information regarding the electronic control points. The automatic generation unit 340 generates a check network surrounding the respective sessions S1 to S3 on the basis of the algorithm for generating a check network by following the check calculation method for control surveys. Further, the automatic generation unit 340 generates the check routes L1 and L2 on the basis of the algorithm for generating a check route by following the check calculation method because the known control points are the electronic control points. Here, the respective sessions are grasped from information obtained by executing simultaneous observation at P1, P2, and P3, then executing simultaneous observation at P2, P3, and P4, and finally executing simultaneous observation at P3, P4, and P5.

Note that, the automatic generation unit 340 may not be able to normally generate a check network or a check route in some cases. As the cause of failure of check network or check route generation by the automatic generation unit 340, the following is conceivable as an example. Observation by the GNSS reception apparatus 100 at a certain installation point had not been executed normally. Thus, observed data at this installation point has not been able to be used in survey calculation, and as a result, check network or check route generation based on the check calculation method is not possible. Some check network or check route generation methods, however, satisfy the check calculation method in some cases. In such a case, the automatic generation unit 340 may generate a check network or a check route with the use of another generation method.

Figure 6:
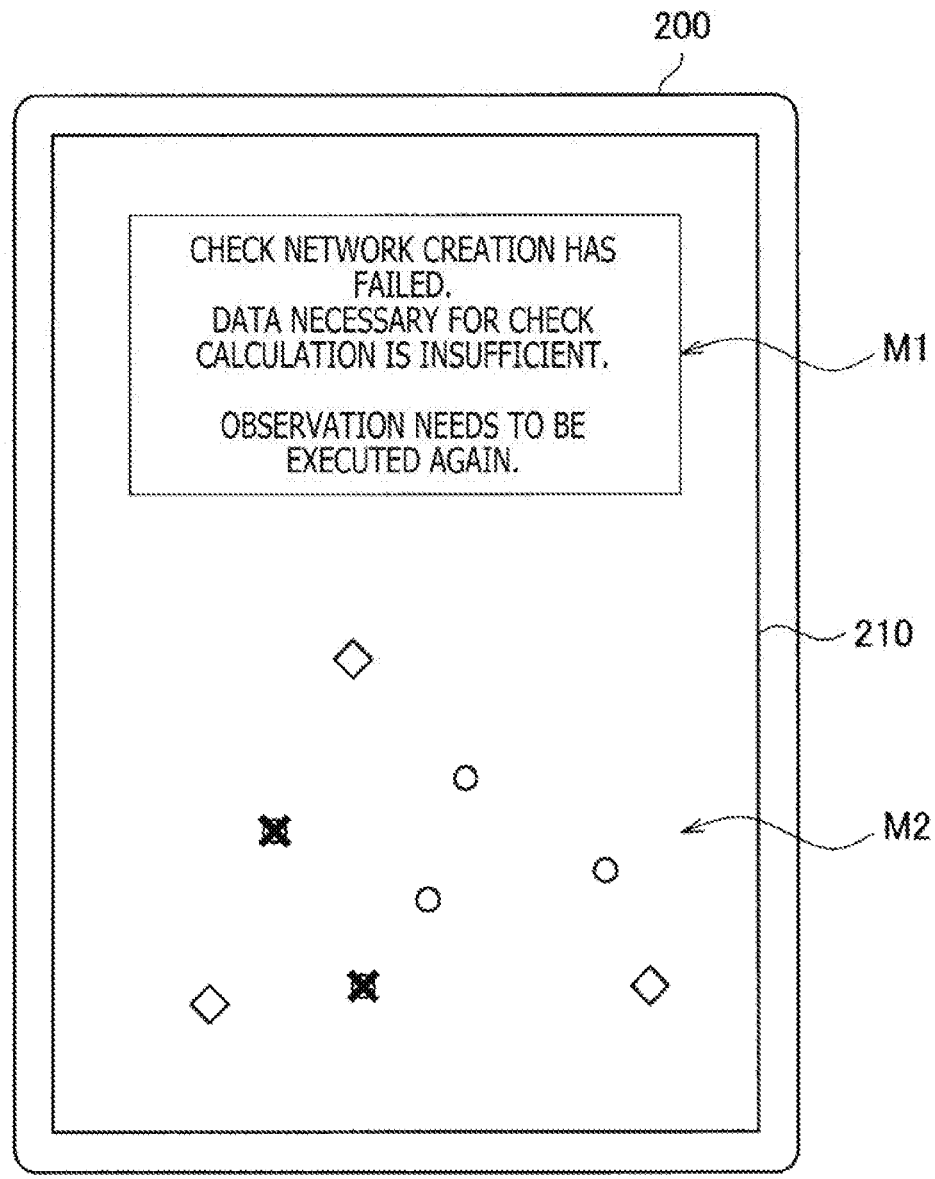
FIG. 6 is a diagram illustrating an example in which a user is notified that the check network has not been generated normally.

In the case as described above, the automatic generation unit 340 may notify the user that this generation has not been performed normally. FIG. 6 is a diagram illustrating an example in which the user is notified that a check network has not been generated normally. In FIG. 6, the client terminal 200 equipped with a display 210 is illustrated. This display 210 displays an error message M1 and an error map M2. In the example of FIG. 6, the error message M1 is a message indicating that a check network has not been generated normally, and the error map M2 is an image indicating the positions of installation points that are the causes of failure of normal check network generation.

In FIG. 6, the automatic generation unit 340 of the survey calculation server 300 notifies the user that the check network has not been generated normally. This is now specifically described. First, in the case where a check network has not been generated normally by the automatic generation unit 340, the automatic generation unit 340 notifies the user that the check network has not been generated normally by displaying a message indicating the failure of check network generation and an image indicating the causes of the failure of check network generation on the client terminal 200 via the communication unit 310. Meanwhile, the client terminal 200 displays the error message M1 and the error map M2 on the display 210, for example, when receiving this notification.

In this way, the survey calculation server 300 has a function of automatically generating a check network or a check route after receiving observation information from the GNSS reception apparatus 100. This function makes it possible to save the user from inputting an observation result and creating a network map for check calculation, with the result that the efficiency of survey work can be increased.

In the case described above, a check network and a check route are automatically generated in check calculation. As described above, in a control survey by the information processing system according to the present embodiment, baseline analysis and check calculation are executed after a check network and a check route are generated. Next, after this check calculation is executed, an adjustment calculation network necessary for execution of three-dimensional traverse calculation is generated. This baseline analysis uses observed data.

Further, in baseline analysis based on the static method, phase center variation (PCV) correction is required to be performed in principle. Note that, the PCV means that the phase centers of the reception antennas of the GNSS reception apparatus 100 are varied depending on the incident angles of radio signals from the GNSS satellites.

Here, the automatic generation unit 340 can generate an adjustment calculation network that is used in three-dimensional traverse calculation on the basis of an automatic generation algorithm. FIG. 7 is a diagram illustrating an example of operation for generating an adjustment calculation network on the basis of the automatic generation algorithm. On the left side of FIG. 7, the installation points P1 to P5 and the electronic control point positions EP1 to EP3 are illustrated. Further, on the right side of FIG. 7, network-adjustment calculation baselines L3 to L9 of an adjustment calculation network are further illustrated.

The automatic generation unit 340 according to the present embodiment generates an adjustment calculation network on the basis of a third automatic generation algorithm with the use of the result of baseline analysis executed on the basis of the generated check network or check route. Further, the adjustment calculation network generated by the automatic generation unit 340 is used in this baseline analysis and three-dimensional traverse calculation. This is specifically described. The automatic generation unit 340 can generate an adjustment calculation network with the use of the result of baseline analysis based on the static method executed by the traverse calculation unit 350.

On the left side of FIG. 7, the installation points P1 to P5 and the electronic control point positions EP1 to EP3 are illustrated similarly to FIG. 5. Meanwhile, on the right side of FIG. 7, the automatic generation unit 340 generates, with the use of the installation points P1 to P5 and the electronic control point positions EP1 to EP3, the network-adjustment calculation baselines L3 to L9 of an adjustment calculation network on the basis of the algorithm for generating an adjustment calculation network by following the three-dimensional traverse calculation method for control surveys.

In this way, the survey calculation server 300 has a function of automatically generating an adjustment calculation network. This function makes it possible to save the user from creating a network map for adjustment calculation, with the result that the efficiency of survey work can be increased.

Next, the traverse calculation unit 350 executes baseline analysis with the use of the generated adjustment calculation network. Further, the traverse calculation unit 350 determines, with regard to the result of this baseline analysis, whether or not there are fix solutions for a part or all of the baselines. It is necessary that the result of baseline analysis using radio signals from the GNSS satellites is a fix solution. Here, the fix solution is an exact solution that satisfies a certain condition.

Figure 8:
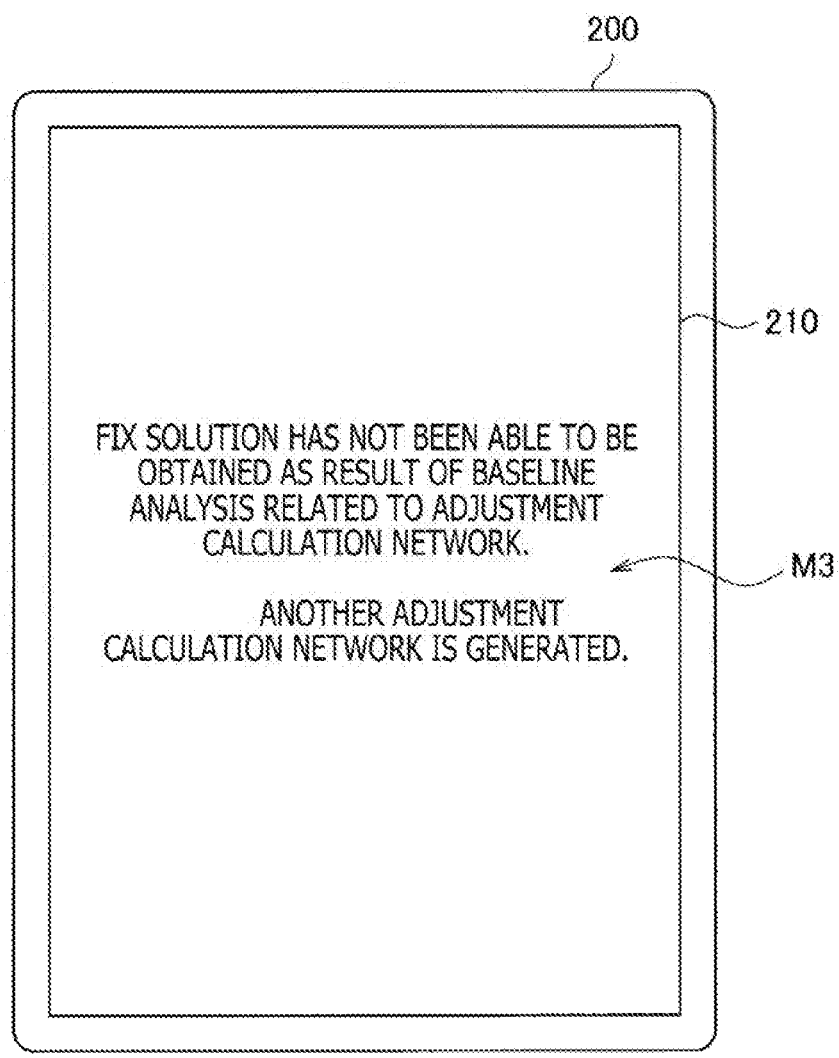
FIG. 8 is a diagram illustrating an example in which the user is notified that a fix solution has not been able to be obtained.

Here, in a case where the traverse calculation unit 350 determines that there is no fix solution for a part or all of the baselines, the traverse calculation unit 350 may notify the user of the result of this determination. FIG. 8 is a diagram illustrating an example in which the user is notified that a fix solution has not been able to be obtained. In FIG. 8, the client terminal 200 equipped with the display 210 is illustrated. The display 210 displays an error message M3 indicating this determination and indicating that another adjustment calculation network is generated.

Next, the traverse calculation unit 350 executes three-dimensional traverse calculation with the use of the result of baseline analysis in which a fix solution has been obtained. Note that, the traverse calculation unit 350 is required to execute, as practical three-dimensional traverse calculation using radio signals from the GNSS satellites, assumed three-dimensional traverse calculation in which one known control point is fixed and strict three-dimensional traverse calculation in which two known control points are fixed. Note that, in the case where all of known control points are electronic control points, the traverse calculation unit 350 is not required to execute assumed three-dimensional traverse calculation.

After executing strict three-dimensional traverse calculation, the traverse calculation unit 350 transmits the result of this execution to the deliverable generation unit 360. The deliverable generation unit 360 generates various deliverables on the basis of the result of this execution, and the control survey-related survey calculation is ended.

In this way, the user is notified of an intermediate result of survey calculation, so that not only the efficiency of survey work can be increased but also the user can more accurately grasp a survey calculation status.

3. Flow of Operation (3-1. Flow of Observation-Related Work)

Figure 9:
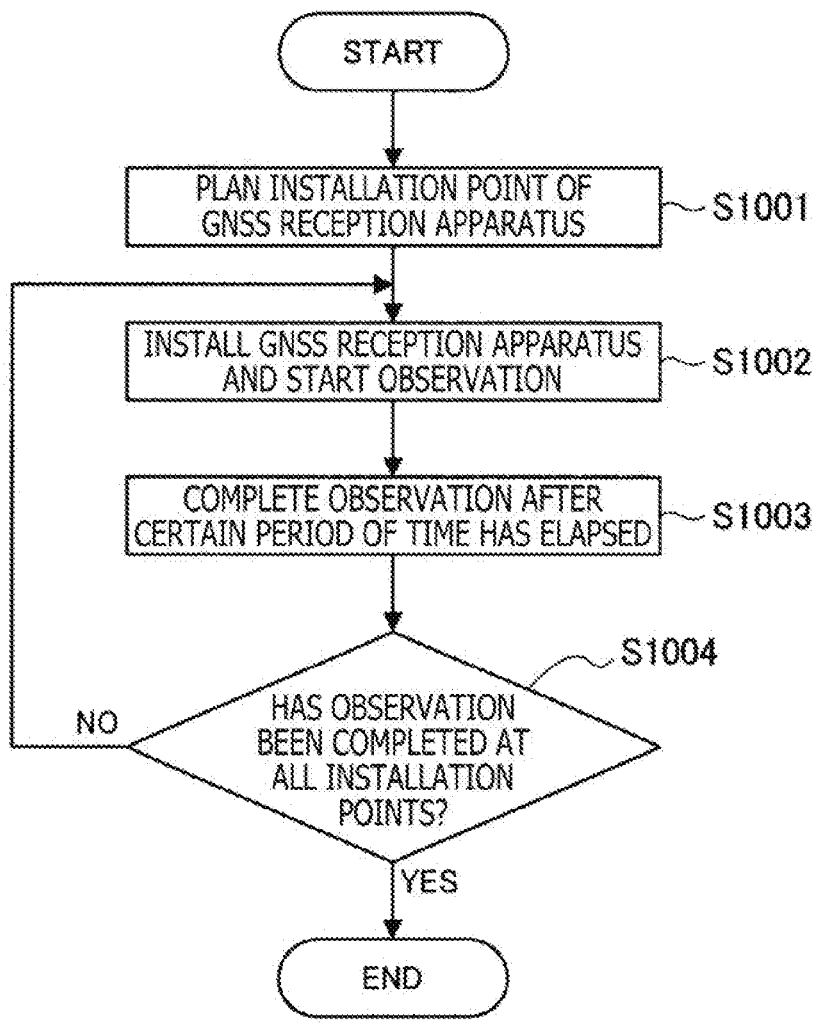
FIG. 9 is a flowchart illustrating an example of the flow of observation-related work using the static method.

Next, the flow of the observation-related work by the GNSS reception apparatus 100 according to the present embodiment is described. FIG. 9 is a flowchart illustrating an example of the flow of the observation-related work using the static method.

With reference to FIG. 9, first, an observer plans in advance a plurality of installation points at which the GNSS reception apparatuses 100 are to be installed by referring to, for example, map information regarding an area to be observed and its surrounding (S1001). Next, the observer installs the GNSS reception apparatuses 100 at the respective installation points, and the GNSS reception apparatuses 100 start observation including reception of radio signals from the GNSS satellites (S1002).

After a certain period of time has elapsed since the start of reception of the radio signals from the GNSS satellites, the GNSS reception apparatus 100 complete observation including reception of the radio signals from the GNSS satellites (S1003). Next, the observer checks whether observation has been completed at all of the installation points planned in advance (S1004). In a case where observation has been completed at all of the installation points (S1004: YES), the observation-related work is ended. In a case where observation has not been completed at all of the installation points (S1004: NO), on the other hand, the processing returns to Step S1002.

(3-2. Flow of Survey Calculation-Related Operation)

Figure 10:
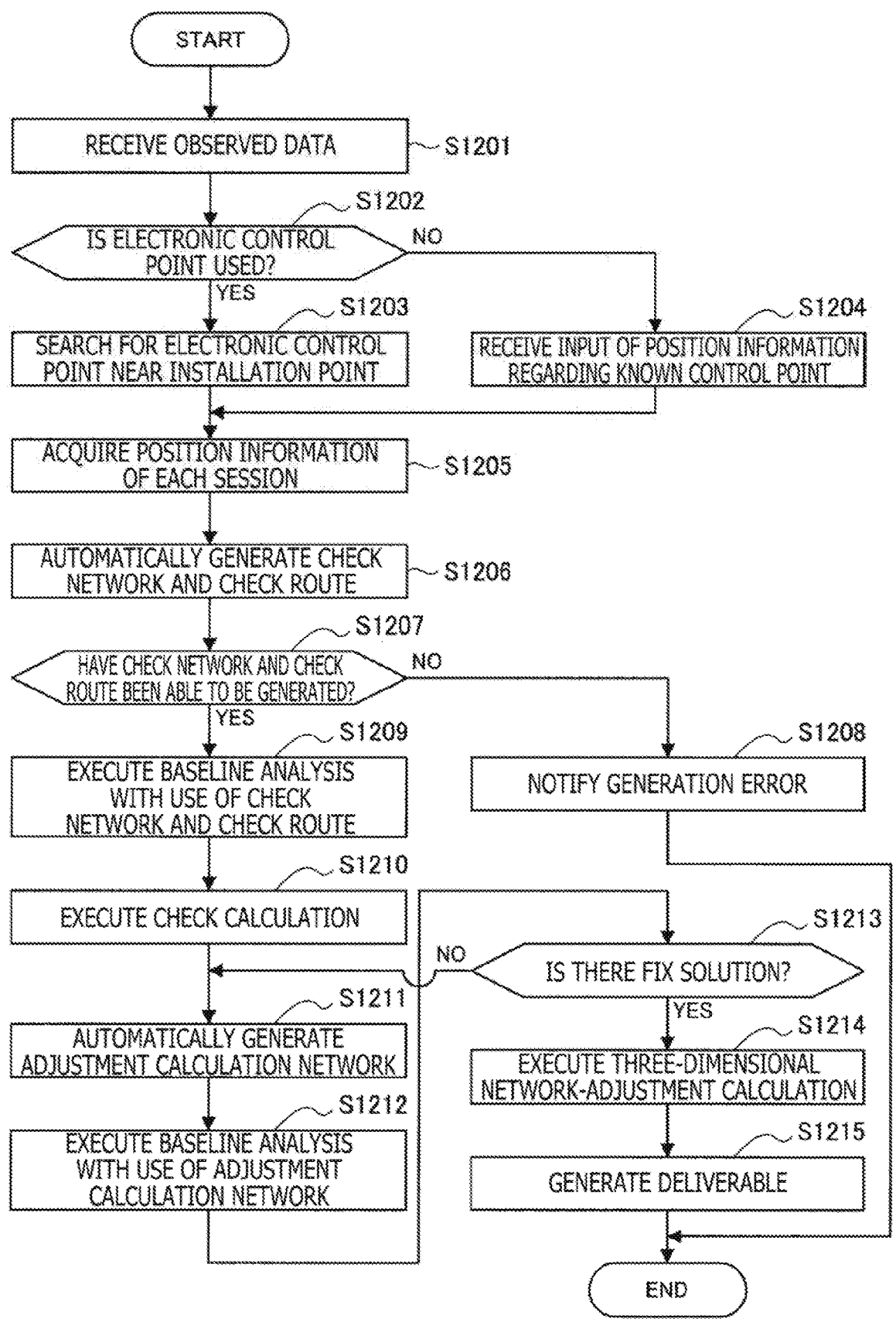
FIG. 10 is a flowchart illustrating an example of the flow of survey calculation-related operation by the survey calculation server 300 according to the first embodiment.

Next, the flow of the survey calculation-related operation by the survey calculation server 300 according to the present embodiment is described. FIG. 10 is a flowchart illustrating an example of the flow of the survey calculation-related operation by the survey calculation server 300 according to the present embodiment.

With reference to FIG. 10, first, the communication unit 310 receives observed data provided from the plurality of GNSS reception apparatuses 100 via the client terminal 200, the observed data being extracted from radio signals that the plurality of GNSS reception apparatuses 100 has received by simultaneous observation (S1201). Next, the communication unit 310 checks whether or not electronic control points are used as known control points in survey calculation to be performed later (S1202). In a case where it is confirmed that the electronic control points are used as the known control points (S1202: YES), the communication unit 310 searches for electronic control points near the installation points, and acquires information associated with these electronic control points (S1203). In a case where it is confirmed that the electronic control points are not used as the known control points (S1202: NO), on the other hand, the communication unit 310 receives an input of position information regarding known control points that is used in this simultaneous observation from the client terminal 200, for example (S1204). Next, the communication unit 310 provides the observed data to the automatic generation unit 340.

Next, the automatic generation unit 340 executes absolute positioning. The automatic generation unit 340 acquires position information belonging to a plurality of different sessions on the basis of position information at each time point associated with the plurality of installation points of the GNSS reception apparatuses 100 obtained by this absolute positioning, and divides the position information into the sessions (S1205). Next, the automatic generation unit 340 generates, with the use of the position information divided into the sessions, a check network and a check route on the basis of the automatic generation algorithms following the check calculation method (S1206).

Next, the automatic generation unit 340 determines whether or not the check network and the check route have been generated normally (S1207). In a case where it is determined that the check network and the check route have not been generated normally (S1207: NO), the user is notified of the content of this determination and the fact that the observation-related work is required to be executed again (S1208). Then, the operation is ended. In a case where it is determined that the check network and the check route have been generated normally (S1207: YES), on the other hand, the traverse calculation unit 350 executes baseline analysis with the use of the observed data and the generated check network and check route (S1209). Next, the traverse calculation unit 350 executes check calculation with the use of the generated check network and check route and the result of baseline analysis obtained in Step S1209 (S1210).

Next, the automatic generation unit 340 generates, with the use of the baseline analysis result obtained in Step S1209, an adjustment calculation network on the basis of the automatic generation algorithm following the three-dimensional traverse calculation method (S1211). The traverse calculation unit 350 executes baseline analysis again with the use of the adjustment calculation network generated in Step S1211 and the observed data (S1212). Next, the traverse calculation unit 350 determines, with regard to the result of baseline analysis obtained in Step S1212, whether or not there are fix solutions for a part or all of the baselines (S1213). In a case where it is determined that there is no fix solution for a part or all of the baselines (S1213: NO), the processing returns to Step S1211. In a case where it is determined that there are fix solutions for a part or all of the baselines (S1213: YES), the traverse calculation unit 350 executes three-dimensional traverse calculation with the use of the baseline analysis result obtained in Step S1212 and the adjustment calculation network generated in Step S1211 (S1214). Next, the deliverable generation unit 360 generates a deliverable of the control survey (S1215), and the operation is ended.

4. Second Embodiment

The first embodiment according to the present disclosure is described above. Subsequently, a second embodiment according to the present disclosure is described. Basically, the same contents as the description of the first embodiment are omitted, and a difference from the first embodiment is descried.

In the first embodiment, the survey calculation server 300 notifies the user whether or not a check network and a check route have been generated normally and a fix solution has been obtained as a result of baseline analysis. In the second embodiment, on the other hand, the traverse calculation unit 350 of the survey calculation server 300 can also notify the user of information associated with an adjustment calculation network used in execution of three-dimensional traverse calculation as a deliverable of a control survey, for example.

Figure 11:
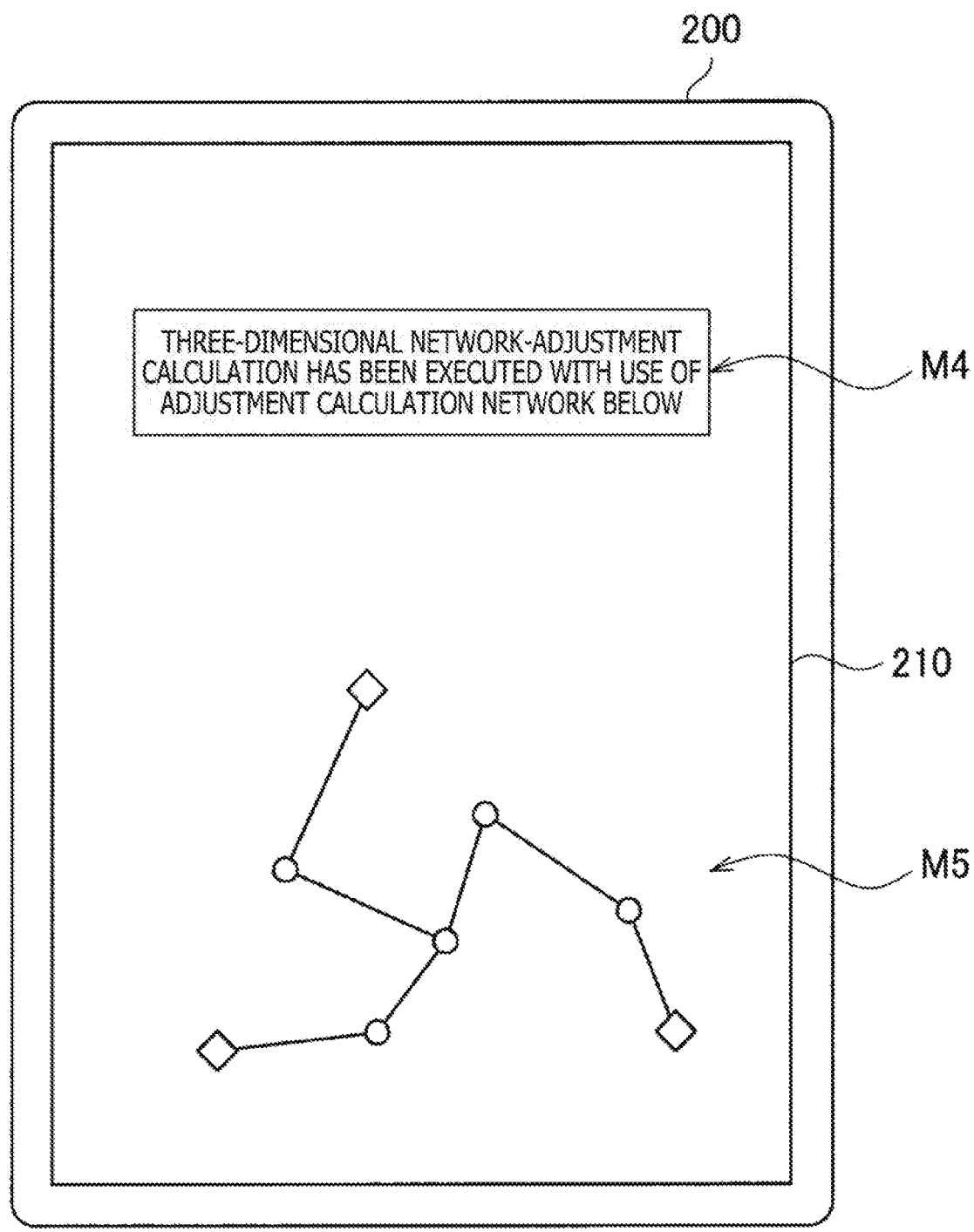
FIG. 11 is a diagram illustrating an example in which the user is notified of information associated with an adjustment calculation network used in execution of three-dimensional traverse calculation according to a second embodiment.

FIG. 11 is a diagram illustrating an example in which the user is notified of information associated with an adjustment calculation network used in execution of three-dimensional traverse calculation. In FIG. 11, the traverse calculation unit 350 of the survey calculation server 300 notifies the user of the information associated with the adjustment calculation network used in execution of three-dimensional traverse calculation. This is specifically described. First, the traverse calculation unit 350 notifies the user of an adjustment calculation network generated to be used in three-dimensional traverse calculation by controlling the client terminal 200 to display the adjustment calculation network, for example. Meanwhile, the client terminal 200 displays, when receiving this notification, a completion message M4 indicating that three-dimensional traverse calculation has been completed with the use of the generated adjustment calculation network and an adjustment calculation network map M5 indicating information regarding this adjustment calculation network on the display 210, for example.

In this way, the user is notified of information associated with an adjustment calculation network used in survey calculation, so that not only the efficiency of survey work can be increased but also the user can more accurately grasp a calculation status.

5. Third Embodiment

Subsequently, a third embodiment according to the present disclosure is described. In a similar manner, the same contents as the description of the first embodiment are omitted, and a difference from the first embodiment is descried.

Figure 12:
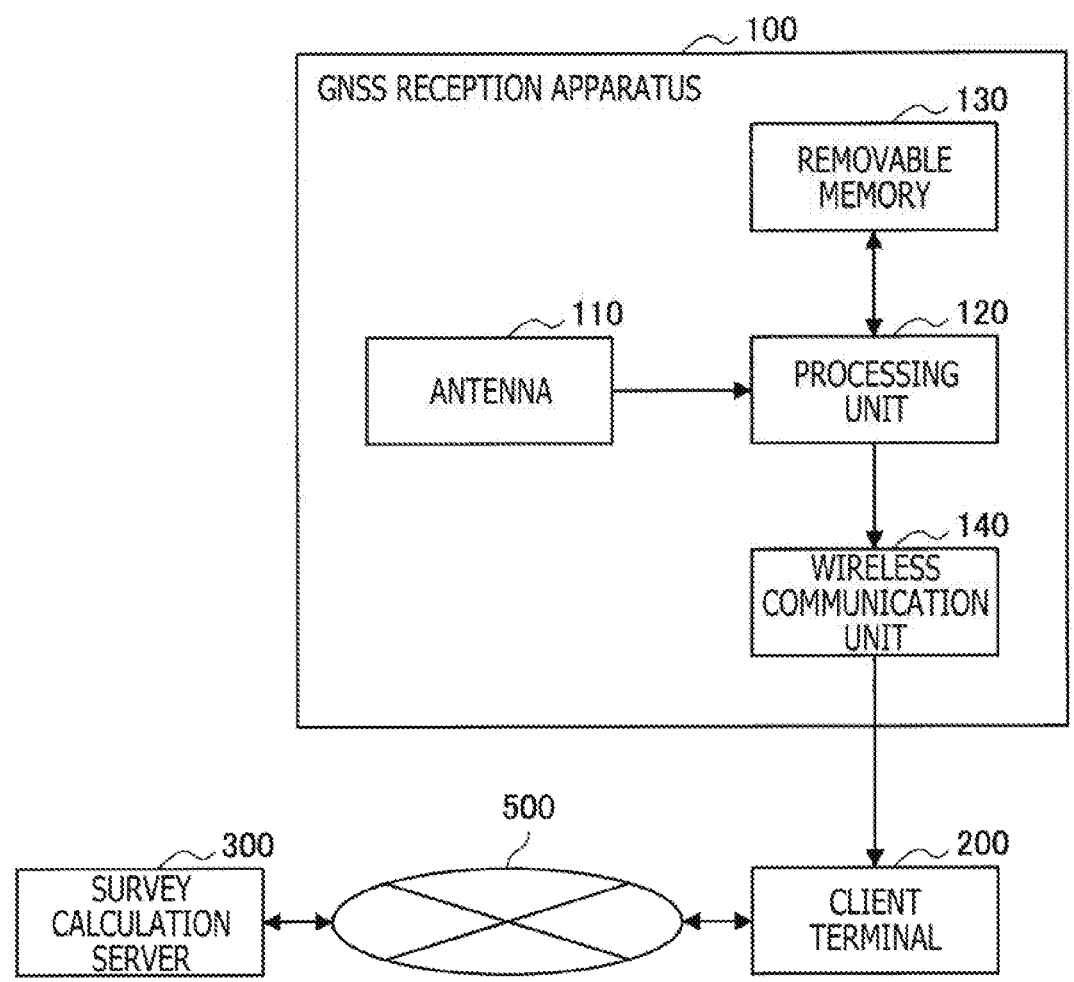
FIG. 12 is a block diagram illustrating a functional configuration example of the GNSS reception apparatus 100 according to a third embodiment.

FIG. 12 is a block diagram illustrating a functional configuration example of the GNSS reception apparatus 100 according to the third embodiment. In FIG. 12, the GNSS reception apparatus 100 further including a wireless communication unit 140 is illustrated. In the first embodiment, observed data that the processing unit 120 has extracted is provided to the client terminal 200 via the removable memory 130. The third embodiment, on the other hand, is an example in which the wireless communication unit 140 of the GNSS reception apparatus 100 transmits observed data to the client terminal 200 through wireless communication. The wireless communication unit 140 according to the present embodiment has a function of transmitting observed data that the processing unit 120 has extracted to the client terminal 200 through wireless communication after simultaneous observation is completed at all of installation points, for example.

In this way, this function of the wireless communication unit 140 according to the present embodiment makes it possible to transfer position information without removable recording media, with the result that a process after the observation-related work is completed can be further saved.

6. Fourth Embodiment

Subsequently, a fourth embodiment according to the present disclosure is described. In a similar manner, the same contents as the description of the first embodiment are omitted, and a difference from the first embodiment is descried.

In the first embodiment, survey work is performed with the use of radio signals that the GNSS reception apparatus 100 have received from the GNSS satellites and position information regarding known control points. On the other hand, an information processing system according to the fourth embodiment further includes a flight imaging apparatus 600 and can execute a survey using an image of the ground taken by a camera 610 of this flight imaging apparatus 600.

Figure 13:
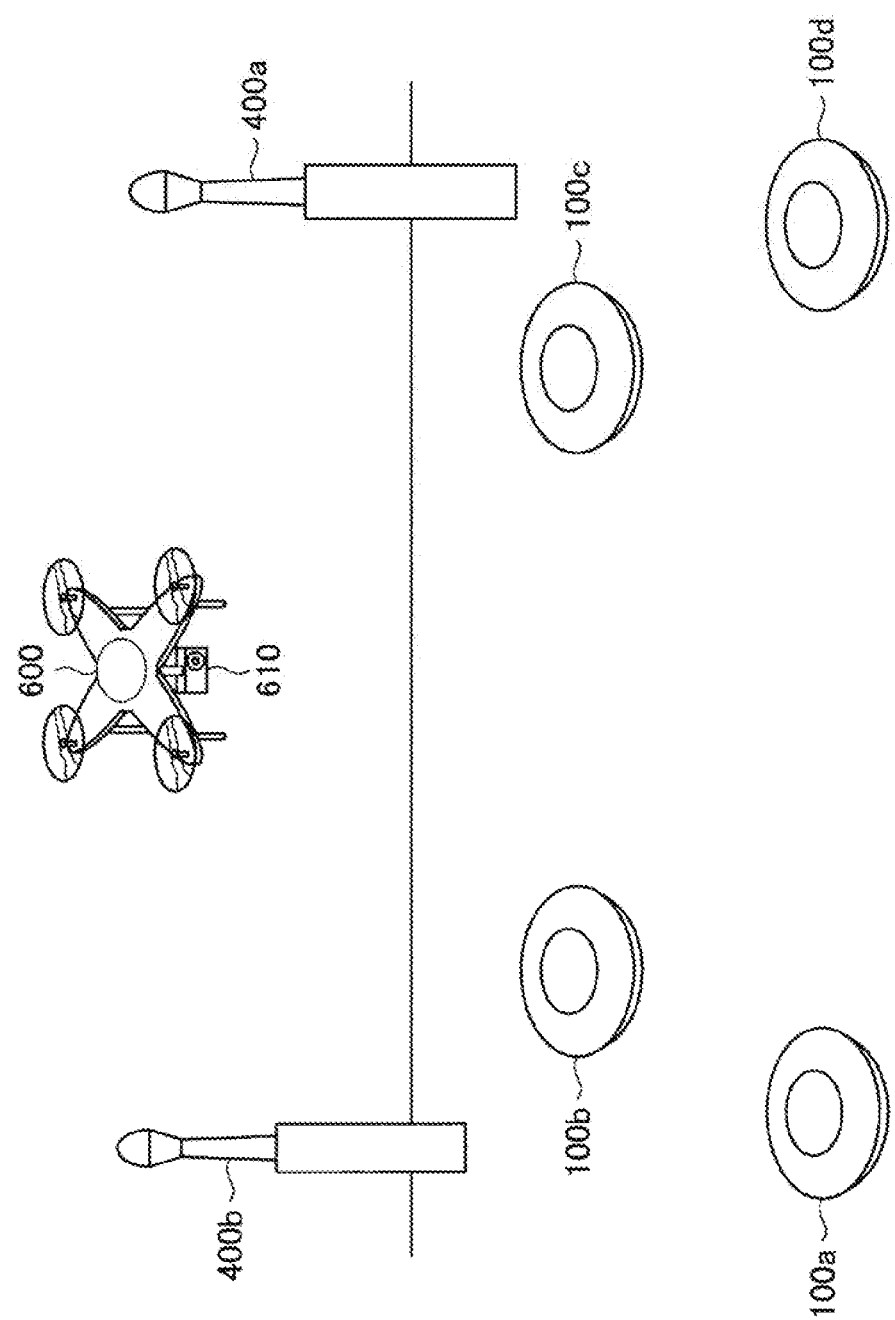
FIG. 13 is a diagram illustrating the outline of observation using a flight imaging apparatus according to a fourth embodiment.

FIG. 13 is a diagram illustrating the outline of observation using the flight imaging apparatus according to the present embodiment. In FIG. 13, the GNSS reception apparatuses 100a to 100d, electronic control points 400a and 400b, and the flight imaging apparatus 600 including the camera 610 are illustrated. Here, the flight imaging apparatus 600 may be an unmanned aerial vehicle (UAV), for example. Further, the flight imaging apparatus 600 may include a GNSS receiver.

In the example of FIG. 13, the flight imaging apparatus 600 follows a flight path planned in advance to fly over an area to be surveyed. Next, the flight imaging apparatus 600 takes an image of an area including the GNSS reception apparatus 100 with the use of the camera 610, to thereby generate a taken image. Note that, the flight imaging apparatus 600 takes the image in observation time from when a state in which the GNSS reception apparatuses 100a to 100d are all executing reception from the GNSS satellites is satisfied to when any of the GNSS reception apparatuses 100a to 100d stops the reception. After the observation-related work is ended, the flight imaging apparatus 600 provides the taken image to the survey calculation server 300 via the client terminal 200. Next, the automatic generation unit 340 of the survey calculation server 300 detects the GNSS reception apparatuses 100a to 100d in the taken image, and associates the positions of the GNSS reception apparatuses 100a to 100d detected in the taken image and the installation points of the GNSS reception apparatuses 100a to 100d with each other, to thereby generate 3D model data.

In this way, through execution of observation using the flight imaging apparatus 600, more detail surveys can be executed.

7. Hardware Configuration Example

Figure 14:
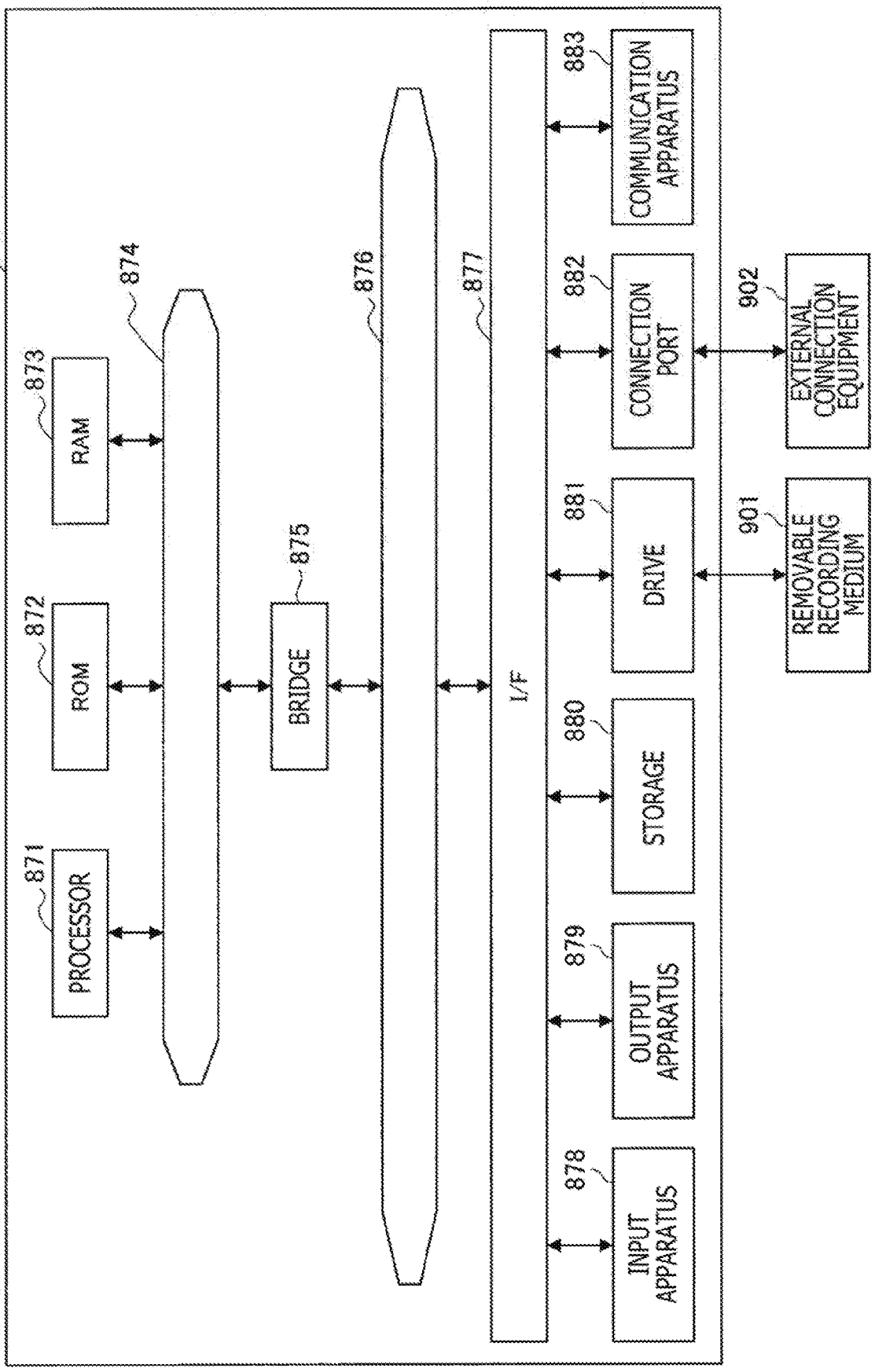
FIG. 14 is a block diagram illustrating a hardware configuration example of the survey calculation server 300 according to one embodiment of the present disclosure.

Next, a hardware configuration example of the survey calculation server 300 according to one embodiment of the present disclosure is described. FIG. 14 is a block diagram illustrating the hardware configuration example of the survey calculation server 300 according to one embodiment of the present disclosure. With reference to FIG. 14, the survey calculation server 300 includes, for example, a processor 871, a read-only memory (ROM) 872, a random-access memory (RAM) 873, a host bus 874, a bridge 875, an external bus 876, an interface 877, an input apparatus 878, an output apparatus 879, a storage 880, a drive 881, a connection port 882, and a communication apparatus 883. Note that, the hardware configuration described herein is an example, and some components may be omitted. Further, components other than the components described herein may further be included.

(Processor 871)

The processor 871 functions as, for example, a computation processing apparatus or a control apparatus, and controls whole operation of each component or part thereof on the basis of various programs recoded on the ROM 872, the RAM 873, the storage 880, or the removable recording medium 901.

(ROM 872 and RAM 873)

The ROM 872 is a section storing, for example, the programs that are read by the processor 871 and data that is used in computation. The RAM 873 temporarily or permanently stores, for example, the programs that are read by the processor 871 and various parameters that are appropriately changed in execution of the programs.

(Host Bus 874, Bridge 875, External Bus 876, and Interface 877)

The processor 871, the ROM 872, and the RAM 873 are connected to each other via the host bus 874 that supports high-speed data transmission, for example. Meanwhile, the host bus 874 is connected, via the bridge 875, to the external bus 876 that supports relatively low-speed data transmission, for example. Further, the external bus 876 is connected to various components via the interface 877.

(Input Apparatus 878)

Examples of the input apparatus 878 include mice, keyboards, touch panels, buttons, switches, and levers. In addition, the examples of the input apparatus 878 include remote controllers capable of transmitting control signals by utilizing infrared rays or other radio waves. Further, the input apparatus 878 includes a sound input apparatus such as a microphone.

(Output Apparatus 879)

The output apparatus 879 is an apparatus capable of notifying a user of acquired information visually or aurally. Examples of the output apparatus 879 include cathode ray tubes (CRT), display apparatuses such as liquid crystal displays (LCD) and organic electroluminescence (EL), audio output apparatus such as speakers and headphones, printers, mobile phones, and facsimile apparatuses. Further, the output apparatus 879 according to the embodiment of the present disclosure includes various vibration devices capable of outputting tactile stimulation.

(Storage 880)

The storage 880 is an apparatus configured to store various pieces of data. Examples of the storage 880 include magnetic storage devices such as hard disk drives (HDD), semiconductor storage devices, optical storage devices, and magneto-optical storage devices.

(Drive 881)

The drive 881 is an apparatus configured to read out information stored in the removable recording medium 901 or write information in the removable recording medium 901. Examples of the removable recording medium 901 include magnetic disks, optical discs, magneto-optical discs, and semiconductor memories.

(Removable Recording Medium 901)

Examples of the removable recording medium 901 include digital versatile disc (DVD) media, Blu-ray (registered trademark) media, high-definition (HD) DVD media, and various semiconductor storage media. As a matter of course, the removable recording medium 901 may be an integrated circuit (IC) card having mounted thereon a contactless IC chip or electronic equipment, for example.

(Connection Port 882)

The connection port 882 is a port for connection with external connection equipment 902. Examples of the connection port 882 include universal serial bus (USB) ports, institute of electrical and electronics engineers (IEEE) 1394 ports, small computer system interfaces (SCSI), recommended standard (RS)-232C ports, and optical audio terminals.

(External Connection Equipment 902)

Examples of the external connection equipment 902 include printers, portable audio players, digital cameras, digital video cameras, and IC recorders.

(Communication Apparatus 883)

The communication apparatus 883 is a communication device for connection with a network. Examples of the communication apparatus 883 include wired or wireless LANs, Bluetooth (registered trademark), communication cards for a wireless USB (WUSB), routers for optical communication, routers for an asymmetric digital subscriber line (ADSL), and modems for various communications.

8. Conclusion

As described so far, the survey calculation server 300 according to the present embodiment has the function of automatically generating a check network, a check route, or an adjustment calculation network on the basis of the various algorithms. With this function, the observer can carry out control surveys more efficiently.

The preferred embodiments of the present disclosure are described in detail above with reference to the attached drawings, but the technical scope of the present disclosure is not limited to the examples. It is apparent that various changes or modifications could be arrived at by persons who have ordinary knowledge in the technical field to which the present disclosure belongs within the scope of the technical idea described in the appended claims, and hence it is understood that such changes or modifications naturally belong to the technical scope of the present disclosure.

For example, the respective steps illustrated in each flowchart referred to above are not necessarily performed in chronological order in the order described as the flowcharts. That is, the respective steps may be performed in an order different from the order described as the flowcharts or performed in parallel to each other.

Note that, the following configurations also belong to the technical scope of the present disclosure.

(1)

An information processing method, including:

acquiring position information associated with installation points of a plurality of observation apparatuses based on signals received from a GNSS satellite by the plurality of observation apparatuses that has executed simultaneous observation, and position information associated with known control points; and generating, by a processor, a check network based on a first automatic generation algorithm by using the position information associated with the installation points of the plurality of observation apparatuses acquired and the position information associated with the known control points.

(2)

The information processing method according to Item (1), further including:

generating, in a case where the known control points are electronic control points, a check route that connects the electronic control points to each other, based on a second automatic generation algorithm by using the position information associated with the installation points of the plurality of observation apparatuses acquired and the position information associated with the electronic control points.

(3)

The information processing method according to Item (1) or (2), further including:

notifying a user that generation of the check network has failed.

(4)

The information processing method according to any one of Items (1) to (3), further including:

generating an adjustment calculation network based on a third automatic generation algorithm by using a result of first baseline analysis executed based on the check network generated, in which the adjustment calculation network is used in execution of three-dimensional traverse calculation.

(5)

The information processing method according to Item (4), further including:

determining, with regard to a result of second baseline analysis executed based on the adjustment calculation network generated, whether or not there is a fix solution for a part or all of baselines; and generating an adjustment calculation network different from the adjustment calculation network, based on the third automatic generation algorithm by using the result of the first baseline analysis in a case where it is determined that there is no fix solution for a part or all of the baselines with regard to the result of the second baseline analysis.

(6)

The information processing method according to Item (5), further including:

notifying a user that it is determined that there is no fix solution for the part or all of the baselines with regard to the result of the second baseline analysis.

(7)

The information processing method according to any one of Items (4) to (6), further including:

notifying a user of information associated with the adjustment calculation network.

(8)

The information processing method according to Item (7), further including:

outputting the information associated with the adjustment calculation network as a deliverable of a control survey.

(9)

The information processing method according to any one of Items (1) to (8), further including:

dividing the position information associated with the installation points of the plurality of observation apparatuses into sessions in each of which the simultaneous observation has been executed; and generating, by a processor, a check network for each of the sessions based on a first automatic generation algorithm by using the position information associated with the installation points of the plurality of observation apparatuses acquired and the position information associated with the known control points.

(10)

The information processing method according to any one of Items (1) to (9), in which the simultaneous observation is executed by one of a static method, an RTK method, and a kinematic method.

(11)

The information processing method according to any one of Items (1) to (10), further including:

detecting the plurality of observation apparatuses from a taken image that has been taken by a flight imaging apparatus and includes the plurality of observation apparatuses; and associating positions of the plurality of observation apparatuses detected in the taken image and positions of the installation points of the plurality of observation apparatuses with each other.

(12)

A program for causing a computer to function as an information processing apparatus including:

an information acquisition unit configured to acquire position information associated with installation points of a plurality of observation apparatuses calculated by the plurality of observation apparatuses that has executed simultaneous observation based on signals received from a GNSS satellite, and position information associated with a known control point; and an automatic generation unit configured to generate a check network based on an automatic generation algorithm by using the position information associated with the installation points of the plurality of observation apparatuses acquired and the position information associated with the known control point.

(13)

An information processing system, including:

a plurality of observation apparatuses configured to execute simultaneous observation based on signals received from a GNSS satellite;

an information acquisition unit configured to acquire position information associated with installation points of the observation apparatuses calculated by the observation apparatuses, and position information associated with a known control point; and an automatic generation unit configured to generate, by a processor, a check network based on a first automatic generation algorithm by using the position information associated with the installation points of the observation apparatuses acquired and the position information associated with the known control point.

What is claimed is:

1. An information processing method, comprising:
   acquiring position information associated with installation points of a plurality of observation apparatuses based on signals received from a global navigation satellite system satellite by the plurality of observation apparatuses that has executed simultaneous observation, and position information associated with known control points; and
   generating, by a processor, a check network by using the position information associated with the installation points of the plurality of observation apparatuses acquired and the position information associated with the known control points,
   wherein the check network is used in execution of a check calculation based on the position information associated with the known control points.

2. The information processing method according to claim 1, further comprising:
   generating, in a case where the known control points are electronic control points, a check route that connects the electronic control points to each other, by using the position information associated with the installation points of the plurality of observation apparatuses acquired and the position information associated with the electronic control points.

3. The information processing method according to claim 1, further comprising:
   notifying a user that generation of the check network has failed.

4. The information processing method according to claim 1, further comprising:
   generating an adjustment calculation network by using a first result of a first baseline analysis executed based on the check network generated,
   wherein the adjustment calculation network is used in execution of a three-dimensional traverse calculation.

5. The information processing method according to claim 4, further comprising:
   in a case where it is determined that there is no fix solution fax the first result, generating a second adjustment calculation network different from the adjustment calculation network;
   executing a second baseline analysis by using the generated adjustment calculation network to generate a second result; and
   determining, based on the second result of the second baseline analysis, whether or not there is a fix solution for the second result.

6. The information processing method according to claim 5, further comprising:
   notifying a user that it is determined that there is no fix solution with regard to the second result of the second baseline analysis.

7. The information processing method according to claim 4, further comprising:
   notifying a user of information associated with the adjustment calculation network.

8. The information processing method according to claim 7, further comprising:
   outputting the information associated with the adjustment calculation network as a deliverable of a control survey.

9. The information processing method according to claim 1, further comprising:
   dividing the position information associated with the installation points of the plurality of observation apparatuses into sessions in each of which the simultaneous observation has been executed,
   wherein the check network is generated for each of the sessions by using the position information associated with the installation points of the plurality of observation apparatuses acquired and the position information associated with the known control points.

10. The information processing method according to claim 1, wherein the simultaneous observation is executed by one of a static method, a real-time kinematic method, and a kinematic method.

11. The information processing method according to claim 1, further comprising:
  detecting the plurality of observation apparatuses from a taken image that has been taken by a flight imaging apparatus and includes the plurality of observation apparatuses; and
  associating positions of the plurality of observation apparatuses detected in the taken image and positions of the installation points of the plurality of observation apparatuses with each other.

12. A non-transitory computer readable medium storing a program for causing a computer to function as an information processing apparatus configured to:
  acquire position information associated with installation points of a plurality of observation apparatuses based on signals received from a global navigation satellite system satellite by the plurality of observation apparatuses that has executed simultaneous observation, and position information associated with a known control point; and
  generate a check network based on an automatic generation algorithm by using the position information associated with the installation points of the plurality of observation apparatuses acquired and the position information associated with the known control point,
  wherein the check network is used in execution of a check calculation based on the position information associated with the known control points.

13. An information processing system, comprising:
  a plurality of observation apparatuses configured to execute simultaneous observation based on signals received from a global navigation satellite system satellite; and
  circuitry configured to:
    acquire position information associated with installation points of the observation apparatuses based on the signals received by the observation apparatuses, and position information associated with a known control point; and
    generate, by a processor, a check network based on a first automatic generation algorithm by using the position information associated with the installation points of the observation apparatuses acquired and the position information associated with the known control point,
  wherein the check network is used in execution of a check calculation based on the position information associated with the known control points.

* * * * *